United States Patent [19]

Harder et al.

[11] Patent Number: 4,725,727

[45] Date of Patent: Feb. 16, 1988

[54] WAVEGUIDE FOR AN OPTICAL NEAR-FIELD MICROSCOPE

[75] Inventors: Christoph S. Harder, Zurich; Wolfgang D. Pohl, Adliswil; Erich P. Stoll, Stallikon, all of Switzerland

[73] Assignee: International Business Machines Corporation, Armonk, N.Y.

[21] Appl. No.: 811,229

[22] Filed: Dec. 20, 1985

[30] Foreign Application Priority Data

Dec. 28, 1984 [EP] European Pat. Off. ......... 84115848.8

[51] Int. Cl.$^4$ ................................................. H01J 5/16
[52] U.S. Cl. ................................. 250/227; 350/96.24; 350/523
[58] Field of Search ............... 350/96.24, 96.29, 96.30, 350/523, 524, 525, 526, 527, 528; 250/227

[56] References Cited

U.S. PATENT DOCUMENTS

| | | | |
|---|---|---|---|
| 3,554,721 | 1/1971 | Gardner | 350/96.24 |
| 4,000,416 | 12/1976 | Goell | 350/96.3 |
| 4,407,561 | 10/1983 | Wysocki | 350/96.3 |

FOREIGN PATENT DOCUMENTS 2301597 7/1974 Fed. Rep. of Germany ...... 350/525

Primary Examiner—Deborah L. Kyle
Assistant Examiner—Richard W. Wendtland
Attorney, Agent, or Firm—John J. Goodwin

[57] ABSTRACT

The waveguide comprises a transparent body having a very sharp point at one end and being coated with a first opaque layer, such as metal. The first opaque layer carries a layer of an optically transparent material which is covered, in turn, by a second opaque layer. The apex of the point has been removed so as to expose the transparent body through a first aperture and to expose the transparent layer through a second aperture, the first aperture occupying an area of less than 0.01 $\mu m^2$.

Light enters the transparent body at its remote end and exits through the first aperture to illuminate an object. Reflected light from the object enters the transparent layer through the second aperture and is guided to a light detector for further processing.

8 Claims, 7 Drawing Figures

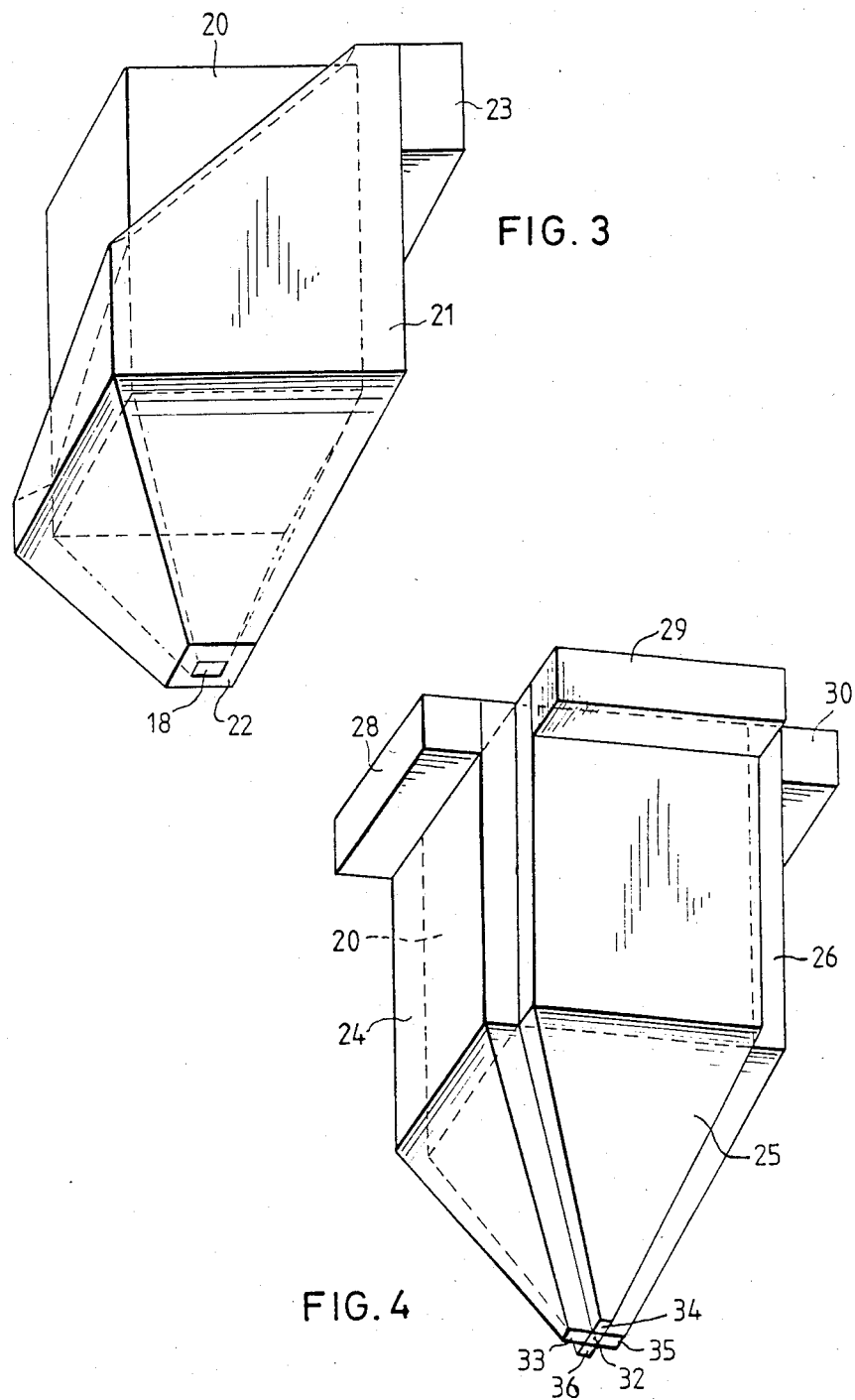

WAVEGUIDE FOR AN OPTICAL NEAR-FIELD MICROSCOPE

DESCRIPTION

1. Field of the Invention

This invention relates generally to the art of optical microscopy and in particular to the design of the objective aperture for an optical near-field scanning microscope.

2. Background of the Invention

Optical microscopes have a long history and their application has since long extended beyond research and the physician's practice. The search for viruses and bacteria as well as the manufacture of electronic circuits require microscopes of ever better resolution. The theoretical limit for the resolution of an optical microscope lies in the range of the wavelength of the light used, i.e. about 500 nm, since direct human inspection naturally requires visible light. The minimum distance between two object points which an optical microscope can resolve, when the illumination is incoherent and the microscope's aperture is circular, is $\sim 0.61 \lambda /n \sin \Theta$, wherein $n \sin \Theta$ is the numerical apeture of the object lens, i.e. the product of the refractive index of the glass n and of the semi-angle $\Theta$ of the cone of rays in the object space. Obviously, the numerical aperture should be large if a high resolving power is to be achieved (M. Born and E. Wolf, Principles of Optics, Pergamon Press, London 1959, p. 417 et seq.).

Numerous attempts to increase the resolving power of microscopes are known from the prior art. The most important achievements relative to the subject of the present invention have been disclosed in a U.S. Pat. Application entitled OPTICAL NEAR-FIELD SCANNING MICROSCOPE, Ser. No. 563,722, filed Dec. 20, 1983 (corresponding to European Patent Application No. EP-A1-0112401) and in a U.S. Patent Application entitled LIGHT WAVEGUIDE WITH A SUBMICRON APERTURE, METHOD FOR MANUFACTURING THE WAVEGUIDE AND APPLICATION OF THE WAVEGUIDE IN AN OPTICAL MEMORY, Ser. No. 563,715, also filed Dec. 20, 1983 corresponding to Europeon Pat. Application No. EP-A1-0112402).

The first above-identified patent application is directed to an optical near-field scanning microscope in which the "objective" consists of an optically transparent crystal having a metal coating with an aperture at its tip, the diameter of the aperture being considerably smaller than one wavelength of the light used for illuminating the object.

The second above-identified patent application describes a light waveguide with an aperture having a diameter of between 10 and 500 nm, and a method for manufacturing such a waveguide. This waveguide also comprises an optically transparent body which is coated with a metal film.

These cited patent applications suggest the use of the objective either as an observing instrument looking at the object which is illuminated by some external light source, or inversely, as the illumination source through which the radiation travels which is reflected by the object and detected by a separate detector. While in both cited applications the purpose of increasing the resolution through reduction of the diameter of the objective is served, there are disadvantages however, such as a very noisy picture and a rather bulky apparatus.

DISCLOSURE OF THE INVENTION

It is an object of the present invention to provide an optical waveguide which overcomes these disadvantages while at the same time maintains the narrowness of the aperture and the ease of manufacture.

Accordingly, the waveguide of the present invention comprises an optically transparent body having a fine point at one end thereof which is coated with a first opaque layer, with the characteristic that said first opaque layer is at least partly covered with a layer of an optically transparent medium which in turn is covered with a second opaque layer, and that the apex at the fine point of said transparent body, including the opaque and transparent layers covering said body, have been removed, such that light entering the transparent body from the back can exit through an aperture at the point and be directed onto an object, and that light reflected by said object can enter said transparent layer through at least one aperture and be guided to a light detector to which the transparent layer is optically connected.

BRIEF DESCRIPTION OF THE DRAWINGS

Details of several embodiments of the invention will now be described by way of example with the aid of the attached drawings, in which:

FIGS. 3 through 5 show embodiments of the waveguide with a square cross-section;

BEST MODE FOR CARRYING OUT THE INVENTION

Figure 1:
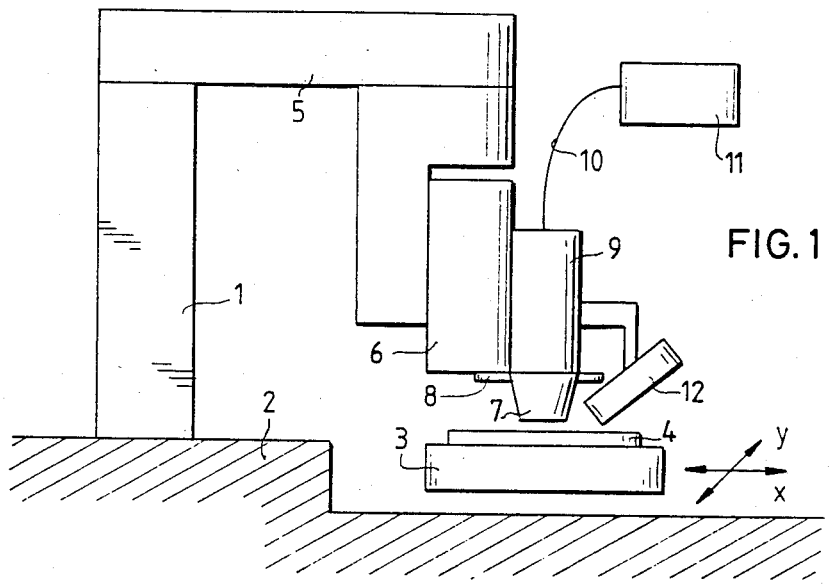
FIG. 1 is a schematic representation of a conventional optical near-field scanning microscope.

FIG. 1 shows the basic elements of an optical near-field scanning microscope as it is known from the previously cited U.S. patent application Ser. No. 563,722. Briefly, a frame 1 is secured to a bench 2 which also carries a support 3 arranged for x/y movement of an object 4 to be inspected. An arm 5 of frame 1 carries a vertical adjustment appliance 6 for controlling the distance of an aperture 7 from object 4 with the aid of a sensor 8. Attached to aperture 7 is an optical filter 9 which in turn is connected, via a light guide 10, to a photodetector 11. This arrangement assumes illumination of object 4 by an external light source, be it in reflection or transmission modes.

In an inverse arrangement, photodetector 11 would be replaced by a suitable light source, such as a laser, and the light reflected from the object would have to be collected by a separate light detector 12.

As mentioned earlier, the present invention contemplates integration of the light source and detector in the vicinity of the object in order to reduce any disturbances that may be caused by ambient light or which might stem from parts of the object other than that very part onto which the aperture is directed.

Figure 2:
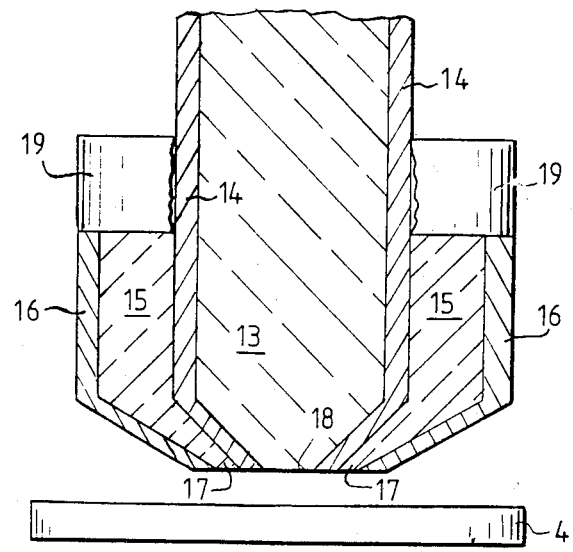
FIG. 2 is a cross-section of one embodiment of the waveguide in accordance with the invention.

Referring to FIG. 2, an optically transparent body 13 is conventionally coated with an opaque layer 14. Body 13 may consist of a quartz crystal, for example, and carry a metal coating the thickness of which should be a few times the optical penetration depth, i.e. about $\lambda/10$ for visible light. Alternatively, body 13 may be the end of an optical fiber with the cladding removed. Body 13 should be pointed as sharply as possible, the radius of curvature of its tip being in the neighborhood of 20 nm, for example. Methods to produce such sharply pointed transparent bodies are disclosed in the previously cited U.S. patent application Ser. No. 563,715. An alternative method is ion milling.

Opaque layer 14 in itself may consist of a single coating of metal or of a plurality of metal coatings, as described in U.S. patent application Ser. No. 563,715, for better adhesion to the crystal or fiber material. Layer 14 carries a transparent layer 15 just thick enough to permit non-overdamped optical waveguiding, i.e. having a thickness on the order of $\lambda/2$, and tapered towards the apex to a thickness of about $\lambda/20$. A second opaque layer 16 is placed around transparent layer 15, and this may again consist of metal. The thickness of the second metal layer is not critical; it should be in the range of tenfold the penetration depth of the metal used. Of course, this layer may consist of several coatings of different metals, as in the case of layer 14. All of these layers 14 through 16 carried by body 13 can be produced by evaporation, sputtering, or other conventional thin film techniques.

Transparent layer 15 enclosed between opaque layers 14 and 16 forms a light waveguide for radiation entering its annular aperture 17 after reflection by the object 4 of rays exiting from a central aperture 18. The tapered shape of transparent layer 15 with a thickness below the wavelength of the light used favors the propagation of the reflected radiation in form of the $TEM_{0l}$ mode, which has no sharp cutoff at subwavelength dimensions (For the $TEM_{0l}$ mode cf. D. Pohl, "Operation of a Ruby Laser in the Purely Transverse Electric Mode $TE_{0l}$," Appl. Phys. Lett., Vol 20, No. 7, Apr. 1, 1972, at page 266 et seq.).

The waveguide 14, 15, 16 may be connected directly to a set of distributed photodetectors concentrically arranged around transparent body 13, or to an annular photodiode 19.

Figure 5:
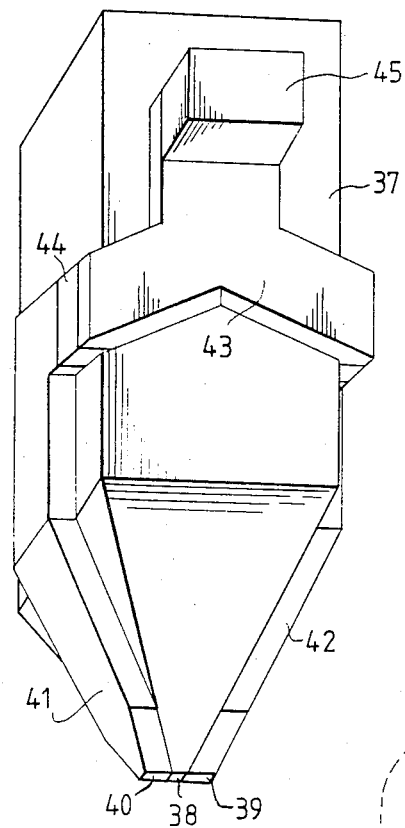

While FIG. 2 assumes a circular cross-section for transparent body 13, which would particularly apply to an optical fiber, FIGS. 3, 4 and 5 show a transparent body with a square cross-section. In FIG. 3, body 20 is partly covered with a transparent layer 21 over a metallization (not shown), the transparent layer 21 being tapered such that light entering through the four-sided aperture 22 is guided into a photodetector 23. The outer metallization of layer 21 also is not shown for clarity.

Another embodiment is shown in FIG. 4 where the square body carries four independent waveguides 24, 25, 26 (waveguide 27 not shown) each ending in an individual photodetector 28, 29, 30 (photodetector 31 not shown). Light emitted from the central aperture 32 and reflected by the object enters into the four rectangular apertures 33 through 36 and is conducted, by the respective one of associated waveguides 24 through 27, to one of said photodetectors 28 through 31. This arrangement is particularly useful for differential microscopy by comparison of the output signals of oppositely located photodetectors.

FIG. 5 shows yet another embodiment with a transparent body 37 having a square cross-section. Light having exited through a central aperture 38 in the body after reflection by the object enters through apertures 39 and 40. The light waves propagating up wave guides 41, 42 are brought to interference at the joint 43 of waveguides 41 and 42. An electrooptic phase shifter 44 permits the adjustment of the relative phases of the arriving light waves. Joint 43 of the waveguides 41 and 42 preferably has a monomode cross-section. This arrangement provides differential phase information. In other words, it introduces phase contrast methods into optical near-field scanning microscopy. To measure this phase contrast signal, a photodetector 45 is connected to joint 43.

Figure 6:
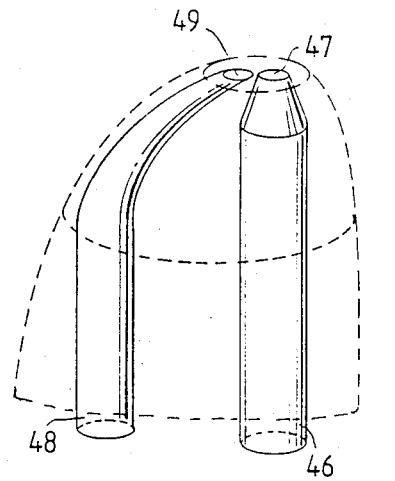
FIGS. 6 and 7 represent embodiments of a waveguide comprising optica fibers.
Figure 7:
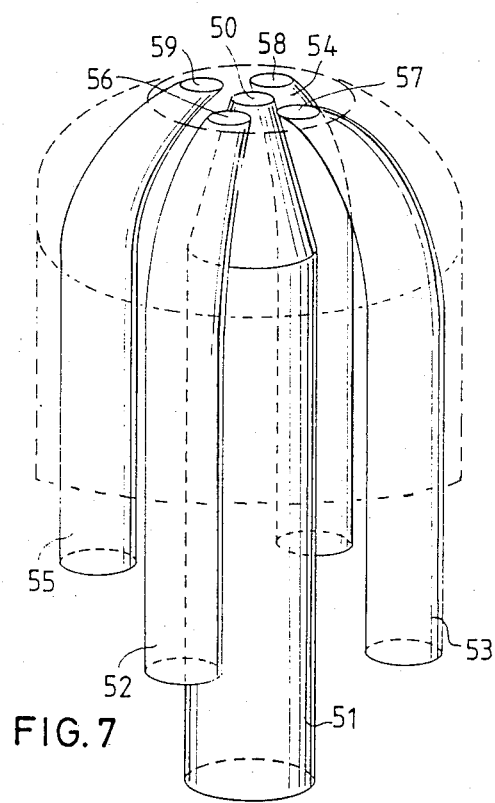

In FIGS. 6 and 7, implementations of the invention making use of glass fibers are shown. A glass rod 46 (FIG. 6) is connected to a light source (not shown) and emits light through an aperture 47. Rod 46 may be realized by a glass fiber. Attached to rod 46 is a glass fiber 48 with its end tapered to about $\lambda/20$ and metallized. Its aperture 49 receives the reflected light which is guided to a detector, not shown.

FIG. 7 is an arrangement with glass fibers in a configuration similar to the one shown in FIG. 4. Around a central glass rod or fiber 51 having an aperture 50 at one end, are arranged four receiving glass fibers 52 through 55 with their ends tapered to about $\lambda/20$ as explained in connection with FIG. 6 and defining apertures 56 through 59, respectively. This arrangement allows for differential reflectivity and differential phase contrast microscopy.

In the arrangements of FIGS. 6 and 7, the spaces between the waveguides may be filled with a low-melting point metal.

If the light source used to illuminate the object is chosen to be a laser, the man skilled in the art may elect to integrate the laser into the transparent body of FIGS. 2 through 5. This can be easily done with a semiconductor laser in accordance with the teaching of U.S. Patent application Ser. No. 563,715.

While the invention has been described in connection with an optical near-field scanning microscope, it will be self-evident for those skilled in the art that the waveguides in accordance with the invention can find application in connection with endoscopes used for the inspection of cavities, be it in living organisms or in natural or man-made devices and machines.

Having thus described our invention, what we claim as new, and desire to secure by Letters Patent is:

1. A waveguide for an optical microscope, comprising:
    an optically transparent body having a tapered point at one end thereof;
    a first opaque layer coated on said body;
    a layer of optically transparent material at least partly covering said first opaque layer;
    a second opaque layer covering said optically transparent layer;
    the apex of said tapered point of said transparent body and the overlying portion of said first and second opaque layers and said transparent layer having all been removed to form a first aperture through which light in said transparent body may exit at the point and be directed towards an object, and to form a second aperture through which reflected light from said object may enter said transparent layer; and
    a light detector optically connected to said transparent layer for receiving light entering said transparent layer through said second aperture.

2. A waveguide as defined in claim 1 wherein the thickness of said optically transparent layer is tapered towards said second aperture to a thickness of about one twentieth of the wavelength of said reflected light.

3. A waveguide as defined in claim 1 wherein said transparent body has a rectangular cross-section and is only partly covered with said transparent layer on top of said first opaque layer, said transparent layer being bevelled such that a light wave entering through said second aperture is guided towards said light detector.

4. A waveguide as defined in claim 1 wherein said transparent body has sides and said transparent layer comprises at least two light guides, each having two ends, each of said light guides being positioned against a side of said transparent body and optically connected to an associated light detector at one end thereof, said other end of each said light guides forming an aperture, said apertures of said light guides being arranged about said first aperture of said transparent body in a symmetrical configuration.

5. A waveguide as defined in claim 1 wherein said transparent body has a square cross-section and said at least two light guides consist of four light guides having apertures arranged in a cross-like configuration.

6. A waveguide as defined in claim 1 wherein said transparent layer is optically connected to a circular light detector.

7. A waveguide as defined in claim 1 wherein said transparent layer and second opaque layer form a pair of light guides carried by said transparent body on opposing sides thereof on top of said first opaque layer, said pair of light guides being connected by a joint to said light detector, one of said light guides being provided with optical phase shifting means.

8. A waveguide as defined in claim 7 wherein said light guides have apertures positioned on opposite sides of said first aperture of said transparent body.

* * * * *